United States Patent
Itou et al.

(10) Patent No.: US 11,431,017 B2
(45) Date of Patent: Aug. 30, 2022

(54) FUEL CELL UNIT

(71) Applicant: TOYOTA JIDOSHA KABUSHIKI KAISHA, Toyota (JP)

(72) Inventors: Masayuki Itou, Sunto-gun (JP); Hiroshi Arisawa, Susono (JP); Atsushi Hayashi, Susono (JP); Shinsuke Aoyagi, Isehara (JP); Keita Kinoshita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 160 days.

(21) Appl. No.: 16/850,439

(22) Filed: Apr. 16, 2020

(65) Prior Publication Data

US 2020/0388872 A1 Dec. 10, 2020

(30) Foreign Application Priority Data

Jun. 7, 2019 (JP) .............................. JP2019-107237

(51) Int. Cl.
*H01M 8/2475* (2016.01)
*H01M 8/0202* (2016.01)

(52) U.S. Cl.
CPC ....... *H01M 8/2475* (2013.01); *H01M 8/0202* (2013.01)

(58) Field of Classification Search
CPC ............. H01M 8/2475; H01M 8/0202; H01M 8/0491; H01M 2250/20; Y02T 90/40; Y02E 60/50

See application file for complete search history.

(56) References Cited

U.S. PATENT DOCUMENTS

| 2012/0028135 A1* | 2/2012 | Ohashi | B60L 58/40 |
| | | | 429/400 |
| 2012/0295173 A1* | 11/2012 | Yamamoto | H01M 8/0618 |
| | | | 429/423 |
| 2018/0257490 A1 | 9/2018 | Imanishi | |

FOREIGN PATENT DOCUMENTS

| JP | 2017-073199 | 4/2017 |
| JP | 2018-152163 | 9/2018 |

* cited by examiner

*Primary Examiner* — Ula C Ruddock
*Assistant Examiner* — Sarika Gupta
(74) *Attorney, Agent, or Firm* — Finnegan, Henderson, Farabow, Garrett & Dunner, LLP (57) ABSTRACT

A fuel cell unit includes: a fuel cell stack including: a cell stack; a first terminal respectively disposed at a first end of the cell stack in the first direction; and a second terminal disposed at a second end of the cell stack in the first direction, an end plate disposed at a side opposite to the cell stack with respect to the first terminal; a power converter that converts output power of the fuel cell stack; a stack case that houses the fuel cell stack; a power converter case that houses the power converter and is fixed to the stack case; a first bus bar that electrically connects the first terminal and the power converter in the stack case and the power converter case; and a second bus bar that electrically connects the second terminal and the power converter in the stack case and the power converter case.

10 Claims, 10 Drawing Sheets

FUEL CELL UNIT

CROSS-REFERENCE TO RELATED APPLICATION

This application is based upon and claims the benefit of priority of the prior Japanese Patent Application No. 2019-107237, filed on Jun. 7, 2019, the entire contents of which are incorporated herein by reference.

FIELD OF THE INVENTION

The present disclosure relates to a fuel cell unit.

BACKGROUND

There is used a power converter such as a converter for converting output power from a fuel cell stack. For example, there is known a fuel cell unit, in which a stack case housing the fuel cell stack is joined to a power converter case housing the power converter, and in which the fuel cell stack is electrically connected to the power converter through bus bars in the stack case and the power converter case (See, for example, Japanese Unexamined Patent Application Publication No. 2017-073199).

In Japanese Unexamined Patent Application Publication No. 2017-073199, a side wall of the stack case is perpendicular to a bottom wall thereof. In light of manufacturability of the stack case, a draft angle may be defined by inclining the side wall of the stack case with respect to the bottom wall. However, when inclining the side wall of the stack case with respect to the bottom wall, the fuel cell unit might increase in size.

SUMMARY

It is therefore an object of the present disclosure to suppress an increase in size of a fuel cell unit.

The above object is achieved by a fuel cell unit including: a fuel cell stack including: a cell stack in which unit cells are stacked in a first direction; a first terminal respectively disposed at a first end of the cell stack in the first direction; and a second terminal disposed at a second end of the cell stack in the first direction; an end plate disposed at a side opposite to the cell stack with respect to the first terminal; a power converter that converts output power of the fuel cell stack; a stack case that houses the fuel cell stack; a power converter case that houses the power converter and is fixed to the stack case; a first bus bar that electrically connects the first terminal and the power converter in the stack case and the power converter case; and a second bus bar that electrically connects the second terminal and the power converter in the stack case and the power converter case, wherein the first terminal includes a first protruding portion protruding from the cell stack and connected to the first bus bar, the second terminal includes a second protruding portion protruding from the cell stack and connected to the second bus bar, the stack case includes: a flange formed into a frame shape defining a first opening at its inside, and fixed to the end plate such that the fuel cell stack is housed in the stack case; a first bottom wall, the fuel cell stack being sandwiched between the first bottom wall and the end plate in the first direction; a first side wall disposed between the fuel cell stack and the power converter, connected between the flange and the first bottom wall, and including a second opening allowing the first and second bus bars to be respectively connected to the first and second terminals; and a second side wall connected between the flange and the first bottom wall, the fuel cell stack being disposed between the first side wall and the second side wall in a second direction perpendicular to the first direction, the first side wall is inclined with respect to the first bottom wall such that a distance between the first side wall and the second side wall is greater at a side of the flange than at a side of the first bottom wall, an angle between the first side wall and the first bottom wall at a side of the fuel cell stack is greater than an angle between the second side wall and the first bottom wall at a side of the fuel cell stack, and the first side wall overlaps the second protruding portion of the second terminal in a third direction perpendicular to the first direction and the second direction.

The angle between the second side wall and the first bottom wall at the side of the fuel cell stack may be a right angle.

The power converter case may include a second bottom wall, the power converter being disposed between the second bottom wall and the first side wall in the second direction, components of the power converter may include a first component, an end portion of the first component at a side of the first side wall may be farthest from the second bottom wall between the components, the first component may be located at a side of the first bottom wall with respect to a middle between the flange and the first bottom wall in the first direction.

The components may include the first component, a second component, and a third component, a distance between the second bottom wall and an end portion of the second component at a side of the first side wall may be smaller than a distance between the second bottom wall and the end portion of the first component, a distance between the second bottom wall and an end portion of the third component at a side of the first side wall may be smaller than the distance between the second bottom wall and the end portion of the second component, and the third component, the second component, and the first component may be arranged in this order from the flange.

One component, of components of the power converter, may include an end portion, at a first side wall, overlapping the first side wall in the first direction.

The power converter case may include a third side wall along the second direction, and the third side wall may include an opening that permits an external device to be electrically connected to the power converter.

The flange may include: a flat surface to which the end plate is fixed, and an outer peripheral surface continuous from an edge of the flat surface, the outer peripheral surface of the flange may be flat from one end to another end in the first direction, and the power converter case may be fixed to the outer peripheral surface of the flange.

A height of the stack case in the second direction may be maximum at a position where the flange is provided.

A length of the first opening in the second direction may be greater than a length of the fuel cell stack in the second direction.

A distance between the first side wall and the second side wall at an end of the second opening at a side of the flange in the second direction may be greater than a length of the fuel cell stack in the second direction.

DETAILED DESCRIPTION

Hereinafter, embodiments according to the present disclosure will be described with reference to the drawings.

First Embodiment

Figure 1:
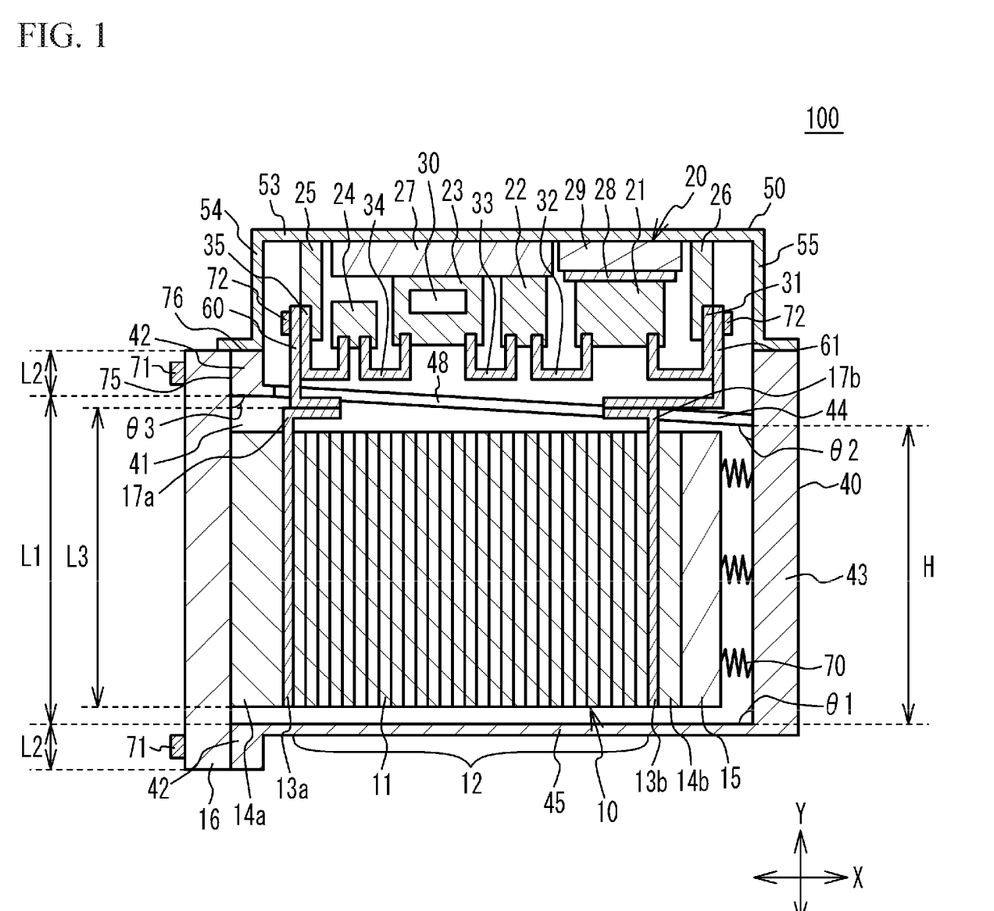
FIG. 1 is a cross-sectional view of a fuel cell unit according to a first embodiment.
Figure 2:
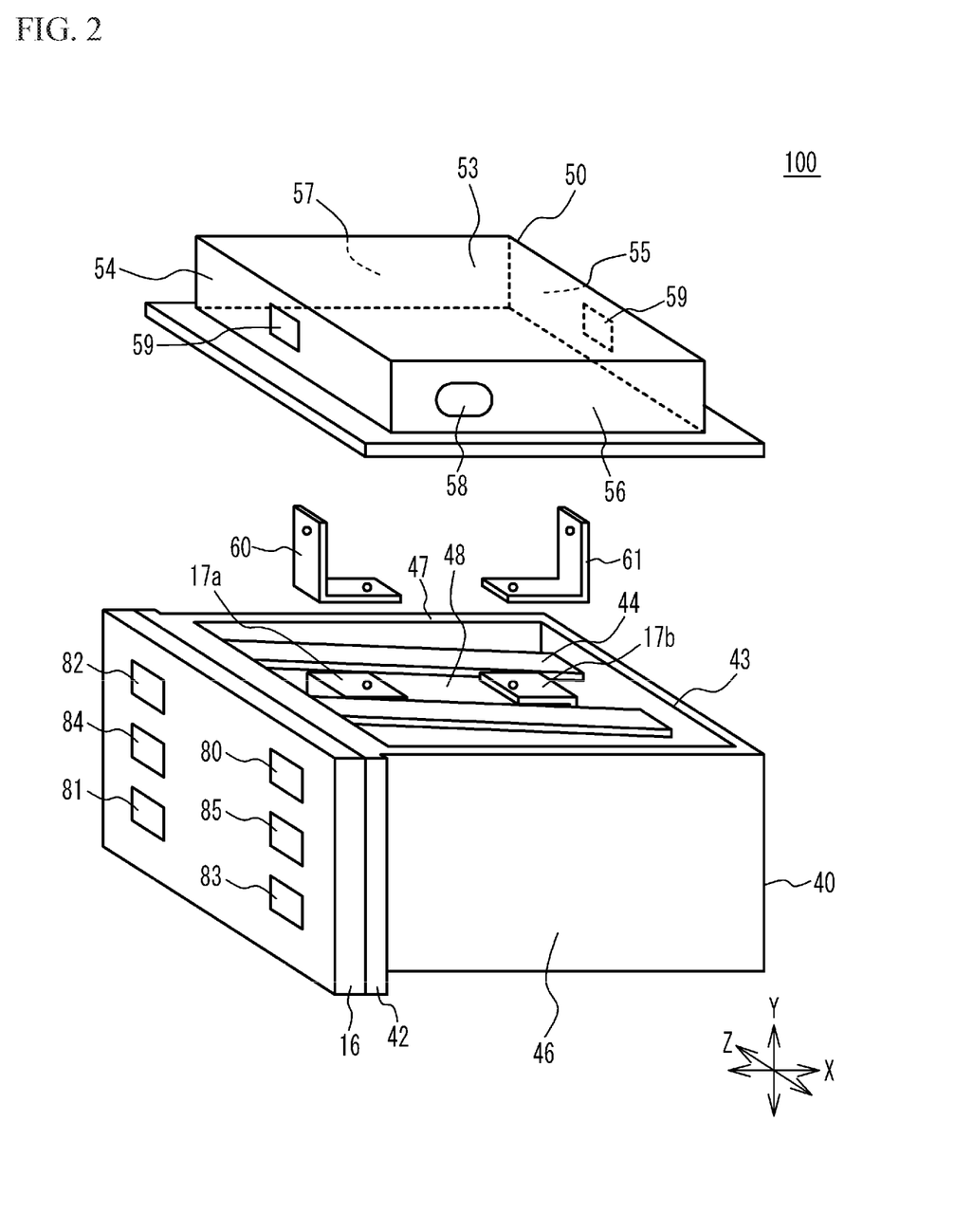
FIG. 2 is an exploded perspective view of the fuel cell unit according to the first embodiment.

FIG. 1 is a cross-sectional view of a fuel cell unit according to a first embodiment. FIG. 2 is an exploded perspective view of the fuel cell unit according to the first embodiment. Some members are illustrated in a back side of a sheet of FIG. 1 without hatching. The same applies to FIGS. 4B to 10. As illustrated in FIGS. 1 and 2, a fuel cell unit 100 according to the first embodiment includes a fuel cell stack 10, an end plate 16, a boost converter 20, a stack case 40, a converter case 50, and bus bars 60 and 61. The boost converter 20 is an example of a power converter. The converter case 50 is an example of a power converter case.

The fuel cell stack 10 includes a cell stack 12, terminals 13a and 13b, insulators 14a and 14b, and a pressure plate 15. Unit cells 11 of the cell stack 12 are stacked in the X direction. The terminals 13a and 13b are respectively disposed at both ends of the cell stack 12 in the X direction. The terminals 13a and 13b respectively have protruding portions 17a and 17b protruding from the cell stack 12.

The end plate 16 is disposed at an opposite side of the cell stack 12 across the terminal 13a and the insulator 14a. As for the fuel cell stack 10, the insulator 14a, the terminal 13a, the cell stack 12, the terminal 13b, the insulator 14b, and the pressure plate 15 are stacked in this order of arrangement on a main surface of the end plate 16. The end plate 16 is fixed to a flange 42 of the stack case 40 with bolts 71. The flange 42 defines an opening 41 at its inside. The end plate 16 is fixed to the flange 42 of the stack case 40, so that the fuel cell stack 10 provided on the end plate 16 is housed in the stack case 40.

The terminals 13a and 13b are plates made of, for example, a metal such as copper, aluminum, or an alloy containing these, or a conductive material such as dense carbon. The terminals 13a and 13b are provided for extracting the electric power generated by the unit cells 11. The insulators 14a and 14b are plates made of an insulating material such as rubber or resin. The insulator 14a is provided for isolating the terminal 13a from the end plate 16 located outside the insulator 14a. The insulator 14b is provided for isolating the terminal 13b from the pressure plate 15 located outside the insulator 14b. The pressure plate 15 is made of a material having high rigidity such as a metal material such as stainless steel or aluminum alloy. The pressure plate 15 is provided for exerting a compressive load on the cell stack 12 with a spring 70 described later. The end plate 16 is made of a highly rigid material, for example, a metal material such as stainless steel or aluminum alloy.

The stack case 40 is provided with the flange 42 defining the opening 41 at its inside as described above, and having a frame shape. The opening 41 is provided at one side in the X direction. The stack case 40 is provided with a bottom wall 43 at the other side in the X direction, and at the opposite side of the end plate 16 across the fuel cell stack 10. The stack case 40 includes side walls 44 to 47 connected between the flange 42 and the bottom wall 43. The stack case 40 is made of a highly rigid material, for example, a metal material such as aluminum alloy.

The spring 70 is provided and compressed between the bottom wall 43 of the stack case 40 and the pressure plate 15. Specifically, the spring 70 is provided such that its length in the X direction is shorter than that of the spring 70 not compressed. The reactive force of the spring 70 applies a compressive load on the cell stack 12 in the stacking direction. The provision of the spring 70 enables the magnitude of the compressive load on the cell stack 12 to fall within a certain range, which improves the power generation performance and the sealing performance Additionally, the spring 70 may not be provided necessarily. In this case, the end plate 16 may be fixed to the flange 42 of the stack case 40 in a state where the cell stack 12 is compressed in the stacking direction, so the end plate 16 and the bottom wall 43 of the stack case 40 may apply a compressive load on the fuel cell stack 10 provided on the end plate 16.

The unit cell 11 is a polymer electrolyte fuel cell that generates power by receiving supply of hydrogen (anode gas) and air (cathode gas) as reactant gases. The unit cell 11 includes: a membrane electrode assembly that is a power generator in which electrodes are arranged on both surfaces of an electrolyte membrane; and a pair of separators that sandwich the membrane electrode assembly. The electrolyte membrane is a solid polymer membrane made of a fluorine resin material or a hydrocarbon resin material having a sulfonic acid group. The electrolyte membrane has good proton conductivity in a wet state. The electrode includes a carbon carrier, and an ionomer that is a solid polymer having a sulfonic acid group and has good proton conductivity in a wet state. The carbon carrier carries a catalyst, for example, platinum or a platinum-cobalt alloy, for promoting a power generation reaction. Each unit cell is provided with manifolds for flowing the reactant gases. The reactant gases flowing through the manifolds are supplied to the power generation region of each unit cell through gas flow paths provided in each unit cell. The unit cell 11 may be a fuel cell other than the polymer electrolyte fuel cell.

There are provided manifolds such as a hydrogen supply manifold 80, a hydrogen discharge manifold 81, an air supply manifold 82, an air discharge manifold 83, a cooling medium supply manifold 84, and a cooling medium discharge manifold 85.

The boost converter 20 is housed in the converter case 50. The converter case 50 is made of a material having high rigidity, for example, a metal material such as aluminum alloy. The converter case 50 includes a bottom wall 53 and side walls 54 to 57. An opening through which the bus bars 60 and 61 passing faces the bottom wall 53 of the converter case 50. The side walls 54 to 57 of the converter case 50 are fixed to the flange 42, the bottom wall 43, and the side walls 46 and 47 of the stack case 40 with bolts. The fuel cell stack 10 and the boost converter 20 are housed in a case composed of the stack case 40, the converter case 50, and the end plate 16 that are fixed, which isolates the fuel cell stack 10 and the boost converter 20 from the outside.

The side wall 44 of the side walls 44 to 47 of the stack case 40 is located between the fuel cell stack 10 and the boost converter 20. The side wall 44 has an opening 48 for permitting the bus bars 60 and 61 to be respectively connected to the terminals 13a and 13b. That is, the bus bars 60 and 61 are respectively connected to the terminals 13a and 13b through the opening 48. The side wall 44 serves as a fastening member for maintaining a compressive load on the cell stack 12. The side wall 45 is located on the opposite side of the side wall 44 across the fuel cell stack 10. That is, the side wall 45 and the side wall 44 sandwich the fuel cell stack 10 in the Y direction perpendicular to the X direction. The side walls 46 and 47, intersecting the side walls 44 and 45, are connected to the flange 42, the bottom wall 43, and the side wall 45. The side walls 45 to 47, not provided with an opening, cover the whole fuel cell stack 10 housed in the stack case 40.

The boost converter 20 includes a reactor 21, a current sensor 22, an intelligent power module (IPM) 23, a capacitor 24, terminal blocks 25 and 26, and conductive members 31 to 35, for example, bus bars or cables. The current sensor 22, the IPM 23, and the capacitor 24 are provided on a printed circuit board 27. An outer peripheral surface of a coil of the reactor 21 is in contact with a cooling tank 29 through a heat dissipation sheet 28. Thus, the boost converter 20 may include the printed circuit board 27, the heat dissipation sheet 28, and the cooling tank 29 as components. The cooling medium for maintaining the temperature of the cooling tank 29 within a predetermined temperature range circulates in the cooling tank 29. This cools the reactor 21. Instead of the heat dissipation sheet 28, a heat dissipation resin material having insulation property may be applied or filled between the reactor 21 and the cooling tank 29. A cooling medium path 30 through which the cooling medium flows is provided in the IPM 23. This cools the IPM 23. The boost converter 20 may include a temperature sensor.

The reactor 21 is electrically connected to the current sensor 22 via the conductive member 32. The current sensor 22 is electrically connected to the IPM 23 via the conductive member 33. The IPM 23 is electrically connected to the capacitor 24 via the conductive member 34. The conductive member 31 electrically connected to the reactor 21 is fixed to the terminal block 26. The conductive member 35 electrically connected to the capacitor 24 is fixed to the terminal block 25. The conductive members 31 to 35 are made of a metal having a low electrical resistivity, such as copper, aluminum, or an alloy containing these.

An end of the bus bar 60 is electrically connected to the protruding portion 17a of the terminal 13a of the fuel cell stack 10 with a bolt. The other end of the bus bar 60 is electrically connected to the conductive member 35 with a bolt 72 on the terminal block 25. An end of the bus bar 61 is electrically connected to the protruding portion 17b of the terminal 13b of the fuel cell stack 10 with a bolt. The other end is electrically connected to the conductive member 31 with the bolt 72 on the terminal block 26. The bus bars 60 and 61 are made of a metal having a low electrical resistivity, such as copper, aluminum, or an alloy containing these. The bus bars 60 and 61 are disposed in the case including the stack case 40 and the converter case 50. The fuel cell stack 10 is electrically connected to the boost converter 20 via the bus bars 60 and 61.

The boost converter 20 boosts the output power of the fuel cell stack 10. The boosted electric power is extracted from an opening 58 provided in the side wall 56 of the converter case 50. That is, the opening 58 is provided for allowing an external device to be connected to an output connector of the boost converter 20.

Figure 3:
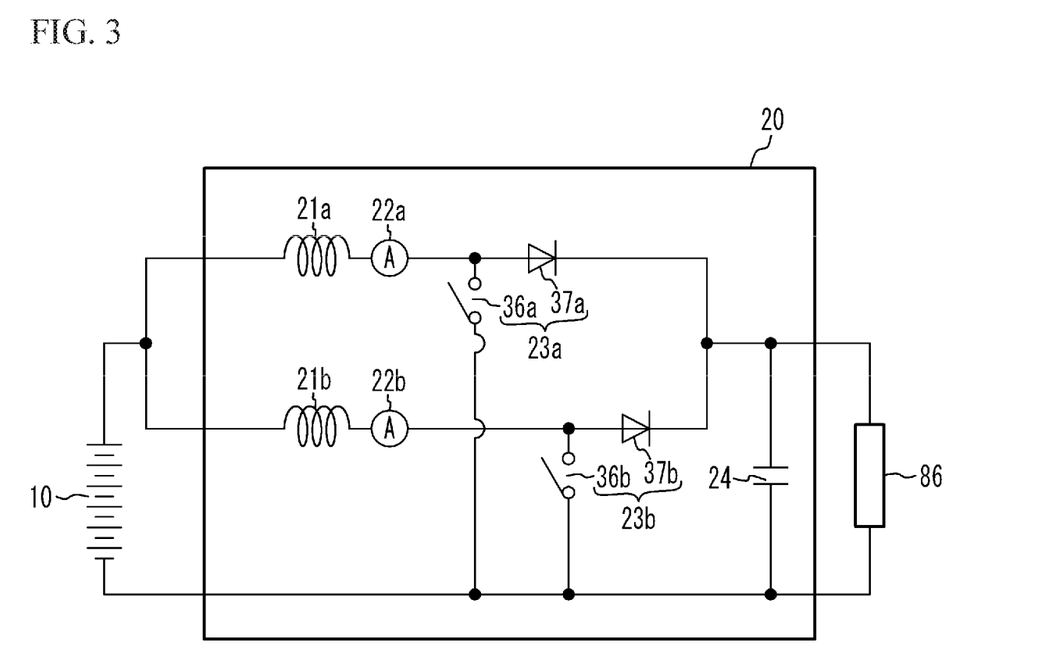
FIG. 3 is a view of a circuit configuration of the fuel cell unit according to the first embodiment.

FIG. 3 is a view illustrating a circuit configuration of the fuel cell unit according to the first embodiment. As illustrated in FIG. 3, the boost converter 20 includes reactors 21a and 21b, current sensors 22a and 22b, an IPM 23a including a switching element 36a and a diode 37a, an IPM 23b including a switching element 36b and a diode 37b, and the capacitor 24. The reactor 21a, the current sensor 22a, and the diode 37a are connected in series. The reactor 21b, the current sensor 22b, and the diode 37b are connected in series. These parts connected in series are connected in parallel to each other. Such a parallel circuit reduces an electric current value which each flows through the reactors 21a and 21b and the IPMs 23a and 23b, which suppresses heat generation. The circuit may not be a parallel circuit necessarily.

The current sensors 22a and 22b are connected to the reactors 21a and 21b on the upstream side or the downstream side thereof, respectively. The switching elements 36a and 36b are controlled to open and close as depending on values detected by the current sensors 22a and 22b, which boosts the output voltage from the fuel cell stack 10. The control of a duty ratio for opening and closing the switching elements 36a and 36b controls a boost ratio of the output voltage to the input voltage in the boost converter 20 and makes a current value flowing through the reactors 21a and 21b substantially uniform.

The boost converter 20 boosts the output voltage of the fuel cell stack 10 and outputs the boosted voltage to an external device 86 connected to the output connector of the boost converter 20 through the opening 58 of the converter case 50. The external device 86 is, for example, an inverter for a motor that drives a vehicle, an inverter of an auxiliary device, for example, an air compressor or a cooling water pump, for driving a fuel cell, an inverter of an auxiliary device for air conditioning of a vehicle, or the like.

As illustrated in FIGS. 1 and 2, the side wall 45 of the stack case 40 is perpendicular to the bottom wall 43. That is, an angle θ1 between the side wall 45 and the bottom wall 43 at the fuel cell stack 10 side is 90 degrees. On the other hand, the side wall 44 is inclined with respect to the bottom wall 43. For example, an angle θ2 between the side wall 44 and the bottom wall 43 at the fuel cell stack 10 side is about 96 degrees, which is greater than 90 degrees. In other words, when it is assumed that the side wall 44 extends to the end plate 16, an angle θ3 between the side wall 44 and the end plate 16 at the fuel cell stack 10 side is about 84 degrees. As described above, the angle θ2 is larger than the angle θ1, and the side wall 44 is inclined with respect to the bottom wall 43 such that a distance H between the side wall 44 and the side wall 45 in the Y direction is greater at the flange 42 side than at the bottom wall 43 side. The side walls 46 and 47 are also inclined with respect to the bottom wall 43. For example, an angle between the side wall 46 and the bottom wall 43 at the fuel cell stack 10 side, and an angle between the side wall 47 and the bottom wall 43 at the fuel cell stack 10 side are 93 degrees.

As for the terminal 13b, of the terminals 13a and 13b, located at the bottom wall 43 side of the stack case 40, the projecting portion 17b enters the opening 48 provided in the side wall 44 of the stack case 40 and overlaps the side wall 44 in the Z direction perpendicular to the X direction and the Y direction. According to an inclination angle of the side wall 44, the protruding portion 17b of the terminal 13b may protrude toward the boost converter 20 from the surface of the side wall 44 at the boost converter 20 side.

On the other hand, as for the terminal 13a located at the flange 42 side of the stack case 40, the protruding portion 17a, not entering the opening 48, is located at the fuel cell stack 10 side with respect to the side wall 44. According to the inclination angle of the side wall 44, the protruding portion 17a of the terminal 13a may enter the opening 48.

Figure 4A:
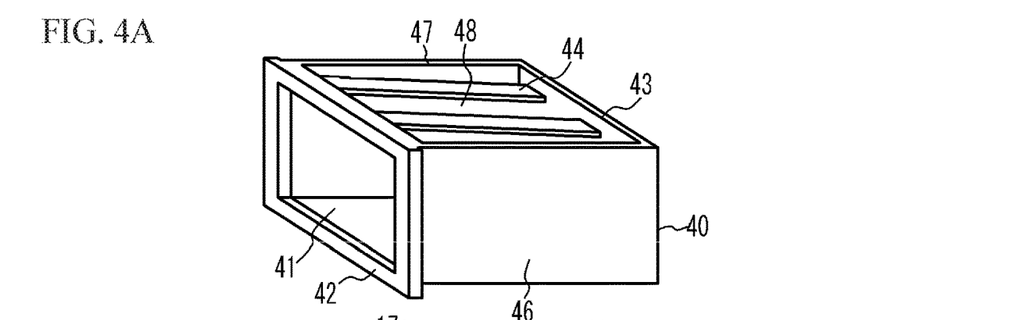
FIGS. 4A to 4D are views of a manufacturing method of a fuel cell unit according to the first embodiment.

FIGS. 4A to 4D are views illustrating a method of manufacturing the fuel cell unit according to the first embodiment. The stack case 40 is prepared as illustrated in FIG. 4A. The stack case 40 is formed by removing a mold from the flange 42 by a casting method or a die casting method. Such a method for manufacturing the stack case 40 reduces manufacturing cost.

Figure 4B:
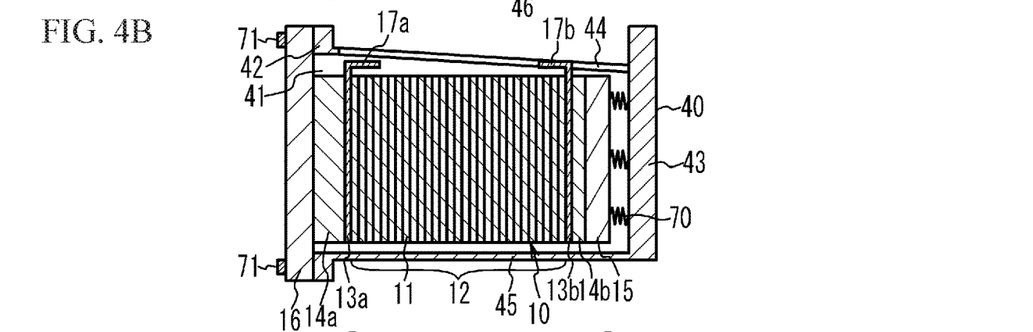

The insulator 14a, the terminal 13a, the cell stack 12, the terminal 13b, the insulator 14b, the pressure plate 15, and the spring 70 are stacked on the end plate 16. After that, as illustrated in FIG. 4B, these stacked members are housed in the stack case 40 through the opening 41. After that, the end plate 16 is fixed to the flange 42 of the stack case 40 with the bolts 71.

Figure 4C:
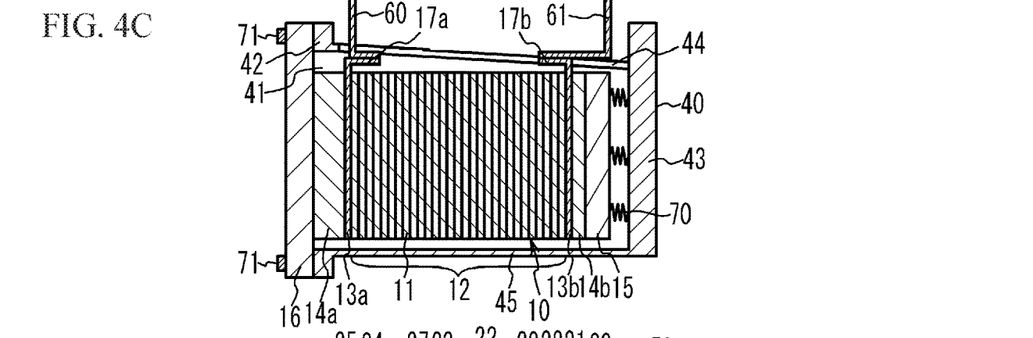

As illustrated in FIG. 4C, an end of the bus bar 60 is fixed to the protruding portion 17a of the terminal 13a with a bolt. An end of the bus bar 61 is fixed to the protruding portion 17b of the terminal 13b with a bolt.

Figure 4D:
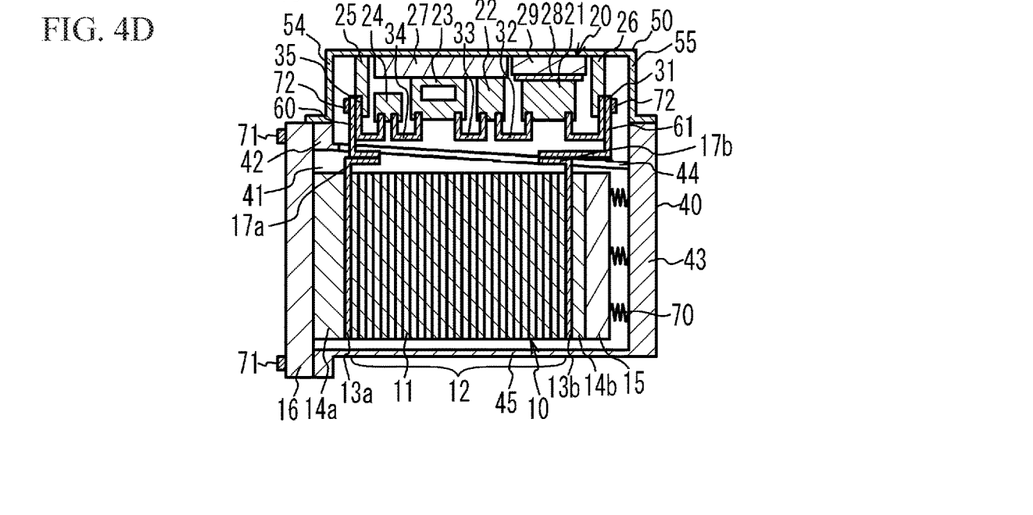

As illustrated in FIG. 4D, the converter case 50 in which the boost converter 20 is housed is fixed to the stack case 40. After that, the other end of the bus bar 60 is fixed to the conductive member 35 of the boost converter 20 with the bolt 72 through an opening 59 (see FIG. 2) provided in the side wall 54 of the converter case 50. The other end of the bus bar 61 is fixed to the conductive member 31 of the boost converter 20 with bolts 72 through the opening 59 provided in the side wall 55 of the converter case 50. After the bus bars 60 and 61 are respectively fixed to the conductive members 31 and 35, the openings 59 are closed with lids or the like.

Figure 5:
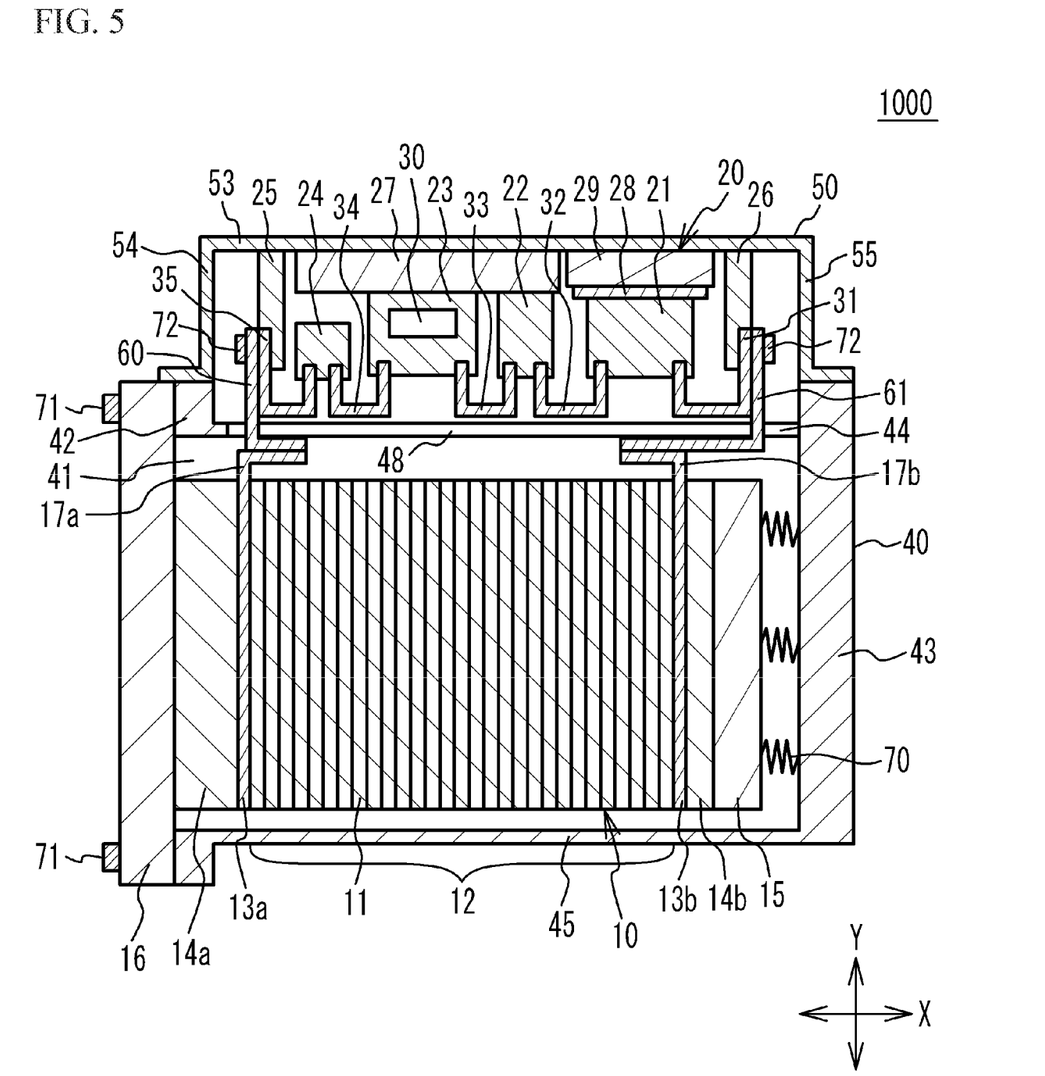
FIG. 5 is a cross-sectional view of a fuel cell unit according to a first comparative example.

FIG. 5 is a cross-sectional view illustrating a fuel cell unit according to a first comparative example. As illustrated in FIG. 5, in a fuel cell unit 1000 according to the first comparative example, the side wall 44 of the stack case 40 is perpendicular to the bottom wall 43. Although not illustrated, the side walls 46 and 47 are also perpendicular to the bottom wall 43. The protruding portion 17b of the terminal 13b, not entering the opening 48 provided in the side wall 44, is located at the fuel cell stack 10 side with respect to the side wall 44. Other components are the same as those of the fuel cell unit 100 according to the first embodiment, and the description thereof is omitted.

In the first comparative example, the protruding portions 17a and 17b of the terminals 13a and 13b are located at the fuel cell stack 10 side with respect to the side wall 44. This is because to facilitate the step illustrated in FIG. 4B, that is, the step of housing stacked members, of the cell stack 12, the terminals 13a and 13b, and the like stacked on the end plate 16, in the stack case 40 through the opening 41.

According to the first comparative example, all of the side walls 44 to 47 of the stack case 40 are perpendicular to the bottom wall 43. In this example, in manufacturing the stack case 40 by a casting method or a die-casting method, it is difficult to remove the mold from the flange 42.

Figure 6:
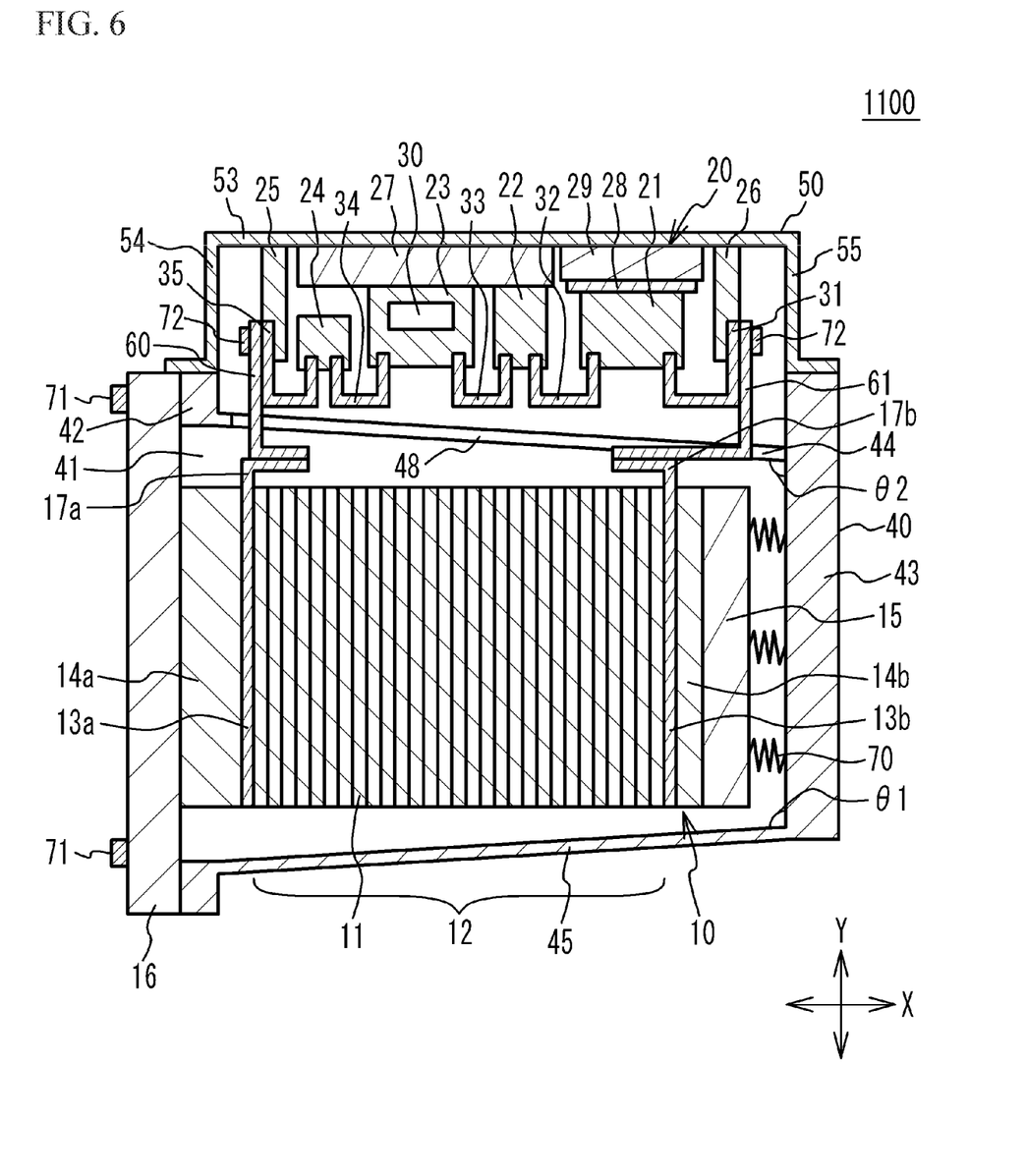
FIG. 6 is a cross-sectional view of a fuel cell unit according to a second comparative example.

FIG. 6 is a cross-sectional view illustrating a fuel cell unit according to a second comparative example. As illustrated in FIG. 6, in a fuel cell unit 1100 according to the second comparative example, the side walls 44 and 45 of the stack case 40 are inclined at the same angle with respect to the bottom wall 43. That is, an angle θ1 and an angle θ2 are the same. The protruding portion 17b of the terminal 13b, not entering the opening 48 provided in the side wall 44, is located at the fuel cell stack 10 side with respect to the side wall 44. Other components are the same as those of the fuel cell unit 100 according to the first embodiment, and the description thereof is omitted.

According to the second comparative example, the side walls 44 and 45 of the stack case 40 are inclined at the same angle with respect to the bottom wall 43. For this reason, in manufacturing the stack case 40 by a casting method or a die-cast method, a draft angle defined by the side walls 44 and 45 facilitates removing the mold from the flange 42. This improves the manufacturability. In order to facilitate removing the mold from the flange 42, the side walls 44 and 45 are generally inclined at the same angle with respect to the bottom wall 43. Further, like the first comparative example, in order to house the stacked members, of the cell stack 12, the terminals 13a and 13b, and the like stacked on the end plate 16, in the stack case 40 through the opening 41, the protruding portions 17a and 17b are located at the fuel cell stack 10 side with respect to the side wall 44. However, this increases the size of the fuel cell unit 1100 according to the second comparative example.

According to the first embodiment as illustrated in FIGS. 1 and 2, the side wall 44 is inclined with respect to the bottom wall 43 such that a distance between the side walls 44 and 45 is greater at the flange 42 side than at the bottom wall 43 side. In manufacturing the stack case 40 by a casting method or a die-casting method, the mold is removed between the side walls 44 and 45 through the opening 41. This improves the manufacturability of the stack case 40. Further, the distance between the side walls 44 and 45 is greater at the flange 42 side than at the bottom wall 43 side, which facilitates housing the fuel cell stack 10 provided on the end plate 16 in the stack case 40 through the opening 41 thereof. As illustrated in FIG. 1, the angle θ2 between the side wall 44 and the bottom wall 43 at the fuel cell stack 10 side is greater than the angle θ1 between the side wall 45 and the bottom wall 43 at the fuel cell stack 10 side. Since the inclination of the side wall 45 with respect to the bottom wall 43 is smaller than that of the side wall 44 with respect to the bottom wall 43 in such a manner, the increase in size of the fuel cell unit 100 caused by the side wall 45 is suppressed. Further, as illustrated in FIGS. 1 and 2, the side wall 44 of the stack case 40 overlaps the protruding portion 17b of the terminal 13b in the Z direction. In the manufacturing method illustrated in FIG. 4, when the stack case 40 is slid to house the fuel cell stack 10 in the stack case 40, the protruding portion 17b of the terminal 13b needs not to interfere with the side wall 44 of the stack case 40. Since the side wall 44 of the stack case 40 is provided with the opening 48, even in a case where the side wall 44 of the stack case 40 overlaps the protruding portion 17b of the terminal 13b in the Z direction, the protruding portion 17b avoids interfering with the side wall 44 of the stack case 40 on the slide locus of the stack case 40. Even in a case where the side wall 44 is inclined with respect to the bottom wall 43, the side wall 44 overlaps the protruding portion 17b of the terminal 13b in the Z direction, whereby increased size of the fuel cell unit 100 in the Y direction due to the inclination of the side wall 44 overlaps increased size of the fuel cell unit 100 in the Y direction due to the protruding portion 17b of the terminal 13b. This suppresses an increase in size of the stack case 40 in the Y direction, which suppresses an increase in size of the fuel cell unit 100. Additionally, a nut is used to attach the bus bar 61 to the protruding portion 17b of the terminal 13b, which needs a predetermined gap between the nut and the cell stack 12. It is therefore difficult to lower the height of the protruding portion 17b of the terminal 13b. This suppresses the increase in size of the fuel cell unit 100, thereby improving the mountability of the fuel cell unit 100 on a vehicle or the like.

As illustrated in FIG. 2, the side wall 56 of the converter case 50 arranged along the Y direction is provided with the opening 58 for electrically connecting an external device to the boost converter 20. In order to flow a large current to the external device, a large size connector tends to be connected thereto through the opening 58, and the converter case 50 tends to be long in the Y direction. A decrease in length of the stack case 40 in the Y direction may suppress an increase in the height of the fuel cell unit 100 in the Y direction. In order to suppress an increase in the height of the fuel cell unit 100 in the Y direction, the angle θ2 between the side wall 44 and the bottom wall 43 may be greater than the angle θ1 between the side wall 45 and the bottom wall 43, and the side wall 44 may overlap the protruding portion 17b of the terminal 13b in the Z direction.

As illustrated in FIG. 1, the flange 42 of the stack case 40 includes: a flat surface 75 to which the end plate 16 is fixed; and an outer peripheral surface 76 continuous from the end of the flat surface 75. The outer peripheral surface 76 of the flange 42 is flat from one end to the other end in the X direction. The converter case 50 is fixed to the outer peripheral surface 76 of the flange 42. For example, if a step is formed on the outer peripheral surface 76 of the flange 42, and if the converter case 50 is fixed to an upper surface or a lower surface of the step on the outer peripheral surface 76, an area where the converter case 50 is fixed might be reduced, and it might be difficult to house the components of the boost converter 20 in the converter case 50. However, since the outer peripheral surface 76 of the flange 42 is flat from one end to the other end in the X direction, the converter case 50 is fixed to the stack case 40 by use of the entire length of the flange 42 in the X direction. It is thus possible to house many parts and large parts in the converter case 50.

As illustrated in FIG. 1, the maximum height of the stack case 40 in the Y direction may be the sum of a length L1 of the opening 41 in the Y direction, a length L2 in the Y direction of the flange 42 located at one side of the opening 41 in the Y direction, and a length L2 in the Y direction of the flange 42 located at the other side of the opening 41 in the Y direction. In other words, a position of the highest of the stack case 40 in the Y direction may be the flange 42. Therefore, the height of the stack case 40 in the Y direction is the minimum necessary height, and the increase in size of the stack case 40 is suppressed, whereby the increase in the size of the fuel cell unit 100 is suppressed. Moreover, since suppression of the increase in size of the stack case 40 suppresses an increase in size of the manufacturing equipment for manufacturing the stack case 40, an increase in equipment cost is suppressed. In case of joining the end plate 16 to the flange 42 via a gasket, an upper side of the length of the flange 42 in the Y direction is almost the sum of a length of an upper side of a groove for the gasket in the Y direction and a length of flat surfaces at both sides across the groove in the Y direction, and a length of the bolt in the Y direction. In case of using a liquid gasket, the upper side of the length of the flange 42 in the Y direction is almost the sum of a length in the Y direction of a flat surface on which the liquid gasket is applied and the length in the Y direction of the bolt.

As illustrated in FIG. 1, the length L1 of the opening 41 in the Y direction is greater than the length L3 of the fuel cell stack 10 in the Y direction. Thus, the fuel cell stack 10 in which the cell stack 12, the terminals 13a and 13b and the like are stacked on the end plate 16 is housed in the stack case 40 through the opening 41.

Figure 7:
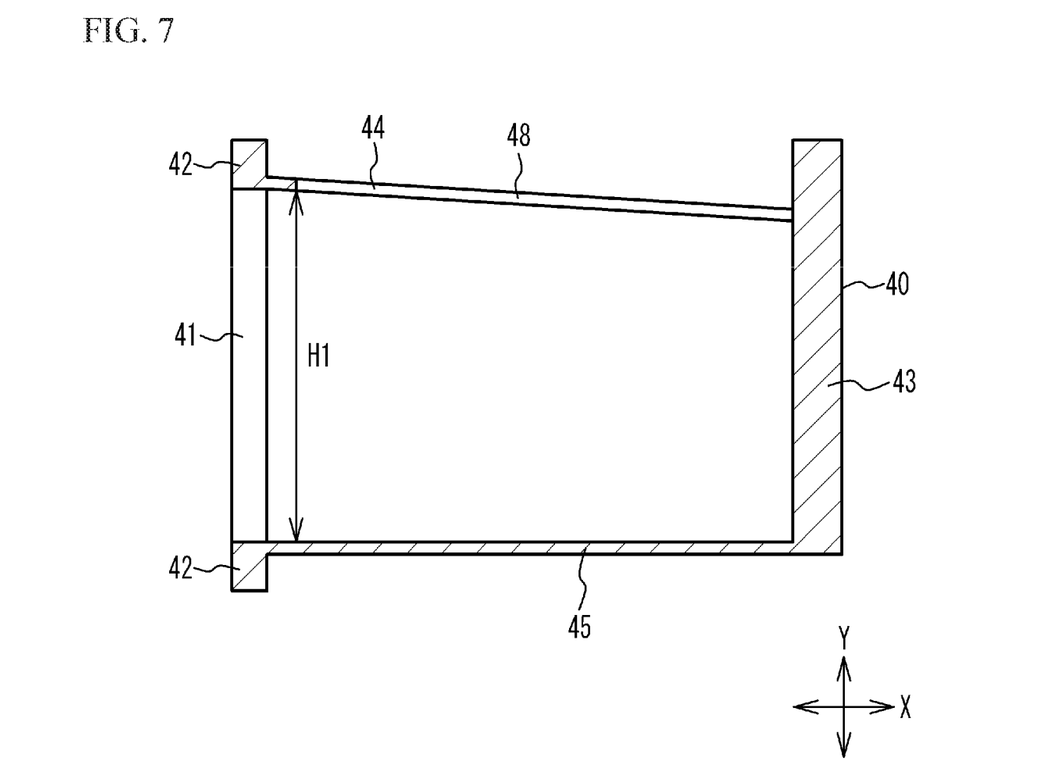
FIG. 7 is a cross-sectional view of a stack case.

FIG. 7 is a cross-sectional view of the stack case. FIG. 7 illustrates a cross section at the opening 48 provided in the side wall 44. As illustrated in FIG. 7, the distance H1 between the side wall 44 and the side wall 45 at the end of the opening 48 at the flange 42 side in the Y direction is greater than the length L3 (see FIG. 1) of the fuel cell stack 10 in the Y direction. Therefore, the fuel cell stack 10 provided on the end plate 16 is linearly assembled into the stack case 40 through the opening 41. It is thus possible to house the fuel cell stack 10 in the stack case 40 with ease.

Second Embodiment

Figure 8:
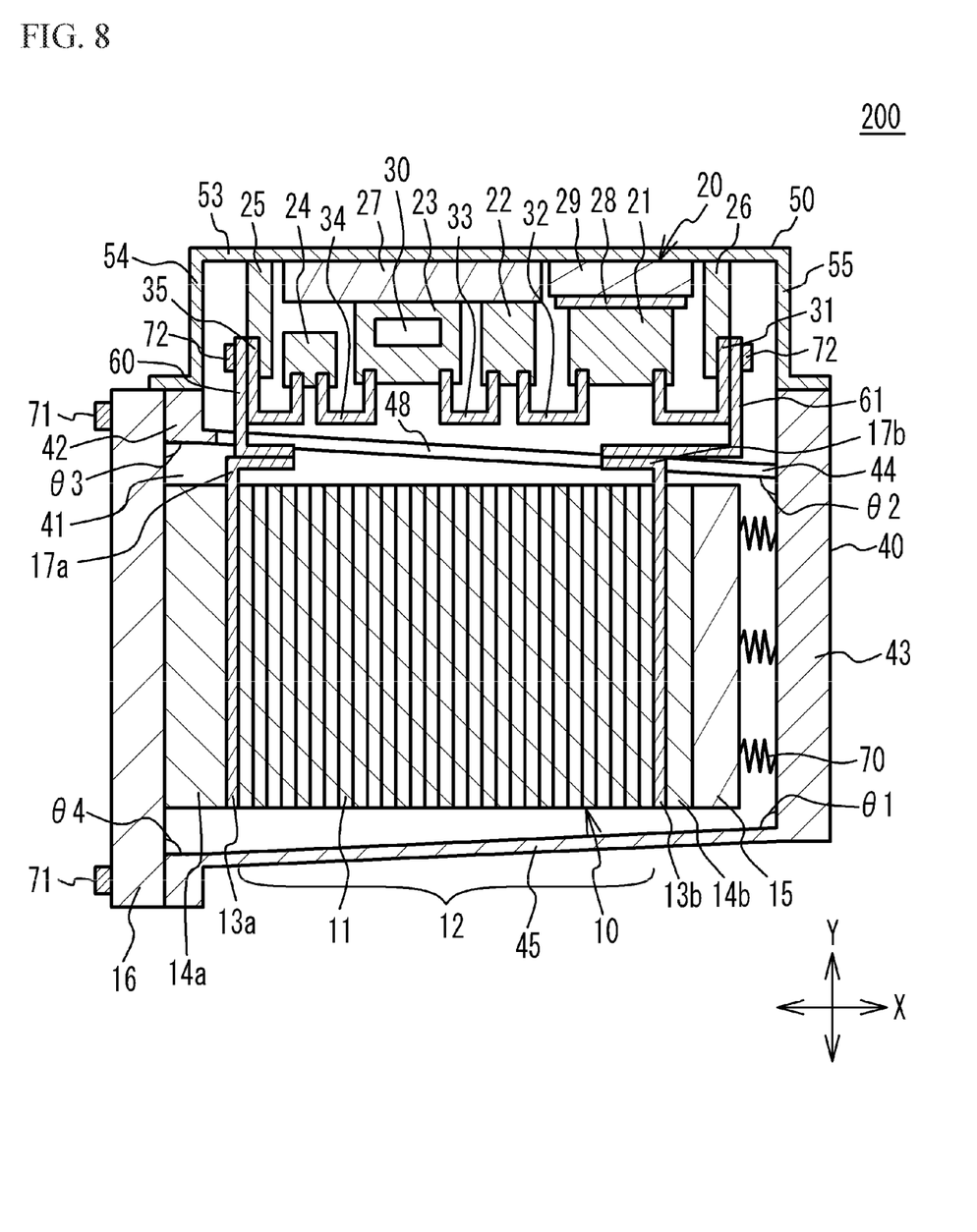
FIG. 8 is a cross-sectional view of a fuel cell unit according to a second embodiment.

FIG. 8 is a cross-sectional view of a fuel cell unit according to a second embodiment. As illustrated in FIG. 8, as for a fuel cell unit 200 according to the second embodiment, the side wall 45 in addition to the side wall 44 are inclined with respect to the bottom wall 43. For example, the angle θ1 between the side wall 45 and the bottom wall 43 at the fuel cell stack 10 side is greater than 90 degrees. For example, the angle θ1 is about 92 degrees. In other words, when it is assumed that the side wall 45 extends to the end plate 16, the angle θ4 between the side wall 45 and the end plate 16 at the fuel cell stack 10 side is about 88 degrees. An angle between the side wall 46 and the bottom wall 43 at the fuel cell stack 10 side is about 93 degrees. An angle between the side wall 47 and the bottom wall 43 at the fuel cell stack 10 side is about 93 degrees. The angle θ2 between the side wall 44 and the bottom wall 43 at the fuel cell stack 10 side is about 94 degrees. In other words, when it is assumed that the side wall 44 extends to the end plate 16, the angle θ3 between the side wall 44 and the end plate 16 at the fuel cell stack 10 side is about 86 degrees. Other components are the same as those of the first embodiment, and the description thereof is omitted.

The first embodiment exemplary describes the side wall 45 of the stack case 40 perpendicular to the bottom wall 43. However, it is not limited to this. As long as the angle θ2 between the side wall 44 and the bottom wall 43 at the fuel cell stack 10 side is greater than the angle θ1 between the side wall 45 and the bottom wall 43 at the fuel cell stack 10 side, the side wall 45 may be inclined with respect to the bottom wall 43 as described in the second embodiment. Both the side walls 44 and 45 inclined with respect to the bottom wall 43 further improves the manufacturability of the stack case 40. On the other hand, from the viewpoint of suppressing an increase in size (height) of the stack case 40, the angle θ1 between the side wall 45 and the bottom wall 43 at the fuel cell stack 10 side may be a right angle. The right angle includes an angle deviated from 90 degrees caused by a manufacturing error.

As long as the size of the stack case 40 at the flange 42 side in the Y direction is larger than that of the stack case 40 at the bottom wall 43 side in the Y direction, and as the fuel cell stack 10 provided on the end plate 16 is housed into the stack case 40 through the opening 41, the angle θ1 between the side wall 45 and the bottom wall 43 may be smaller than 90 degrees.

Third Embodiment

Figure 9A:
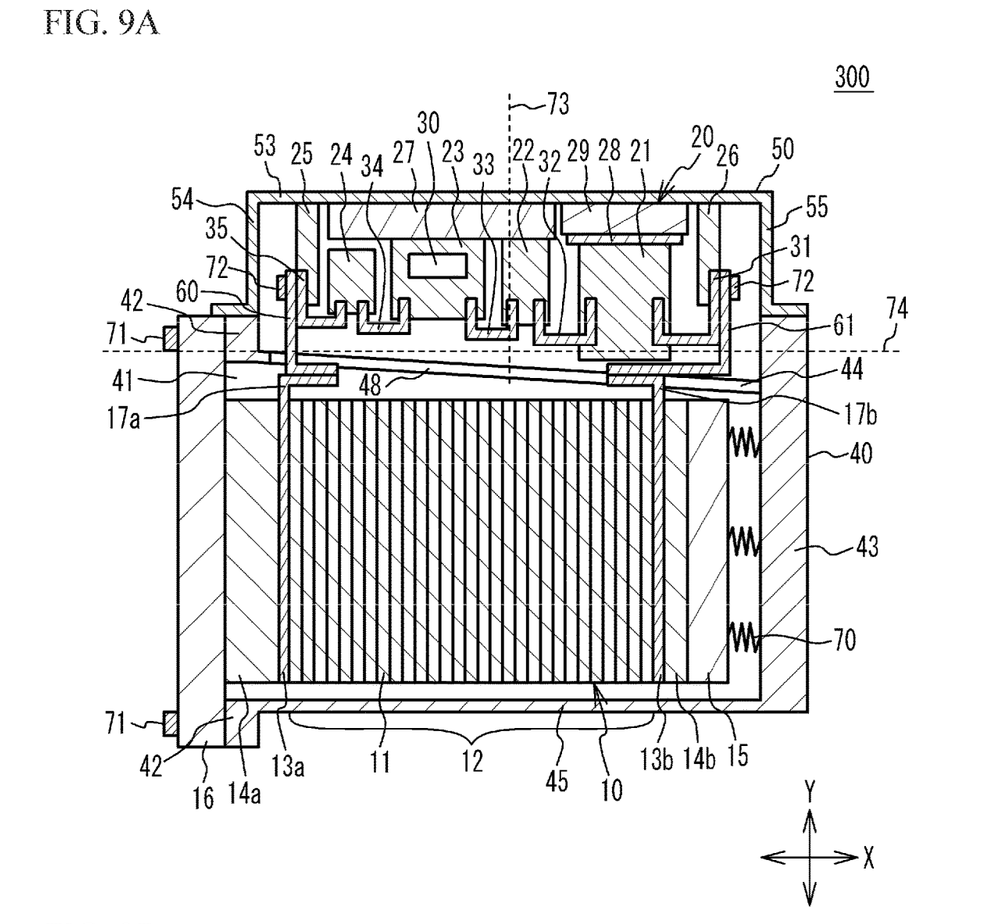
FIG. 9A is a cross-sectional view of a fuel cell unit according to a third embodiment.
Figure 9B:
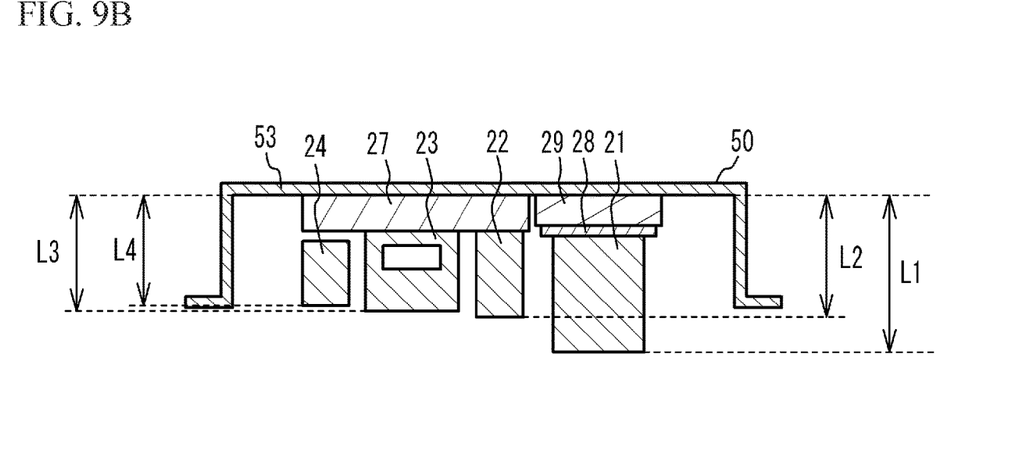
FIG. 9B is a cross-sectional view of components of a boost converter housed in a converter case.

FIG. 9A is a cross-sectional view of a fuel cell unit according to a third embodiment. FIG. 9B is a cross-sectional view of some components of a boost converter housed in the converter case. As for a fuel cell unit 300 according to the third embodiment as illustrated in FIGS. 9A and 9B, the reactor 21, the current sensor 22, the IPM 23, and the capacitor 24 of the boost converter 20 respectively have end portions at the side wall 44 side of the stack case 40. A distance L1 is defined between the bottom wall 53 of the converter case 50 and the end portion of the reactor 21. A distance L2 is defined between the bottom wall 53 and the end portion of the current sensor 22. A distance L3 is defined between the bottom wall 53 and the end portion of the IPM 23. A distance L4 is defined between the bottom wall 53 and the end portion of the capacitor 24. The distances L1 to L4 are different from one another. For example, the distance L1 between the end portion, at the side wall 44 side, of the reactor 21 and the bottom wall 53 of the converter case 50 is greater the distance L2 between the end portion, at the side wall 44 side, of the current sensor 22 and the bottom wall 53 of the converter case 50. The distance L2 between the end portion, at the side wall 44 side, of the current sensor 22 and the bottom wall 53 of the converter case 50 is greater than the distance L3 between the end portion, at the side wall 44 side, of the IPM 23 and the bottom wall 53 of the converter case 50. The distance L3 between the end portion, at the side wall 44 side, of the IPM 23 and the bottom wall 53 of the converter case 50 is greater than the distance L4 between the end portion, at the side wall 44 side, of the capacitor 24 and the bottom wall 53 of the converter case 50. That is, as for the distance between the end portion, at the side wall 44 side of the stack case 40, and the bottom wall 53 of the converter case 50, the distance L1 regarding the reactor 21 is greatest. The distance L1 regarding the reactor 21, the distance L2 regarding the current sensor 22, the distance L3 regarding the IPM 23, and the distance L4 regarding the capacitor 24 are decreasing in this order.

The reactor 21 is located at the bottom wall 43 side with respect to a virtual surface 73 that is located at the middle between the flange 42 and the bottom wall 43 of the stack case 40 in the X direction. For example, the capacitor 24, the IPM 23, the current sensor 22, and the reactor 21 of the boost converter 20 are arranged from the flange 42 side in decreasing order in distance between the end portion at the side wall 44 side of the stack case 40, and the bottom wall 53 of the converter case 50. The reactor 21 having the longest distance between the end portion, at the side wall 44 side of the stack case 40, and the bottom wall 53 of the converter case 50 is located closest to the bottom wall 43 side of the stack case 40, among the reactor 21, the current sensor 22, the IPM 23, and the capacitor 24 of the boost converter 20.

Further, the reactor 21 protrudes toward the side wall 44 across a virtual surface 74. The virtual surface 74 extends in parallel to the X direction and passes through a point where the surface of the side wall 44 of the stack case 40 at the boost converter 20 side is connected to the flange 42. In other words, the end portion of the reactor 21, at the side wall 44 side of the stack case 40, overlaps the side wall 44 in the X direction. Other components are the same as those of the first embodiment, and the description thereof is omitted.

According to the third embodiment, the reactor 21 whose end portion at the side wall 44 side of the stack case 40 is farthest from the bottom wall 53 of the converter case 50 among the components of the boost converter 20 is located at the bottom wall 43 side with respect to the middle between the flange 42 and the bottom wall 43 in the X direction. Thus, the certain distance between the end portion of the reactor 21 and the side wall 44 of the stack case 40 is ensured, and a space formed by the inclination of the side wall 44 of the stack case 40 with respect to the bottom wall 43 is effectively used. This suppresses the increase in size (high profile) of the fuel cell unit 300. The reactor 21 whose end portion at the side wall 44 side of the stack case 40 is farthest from the bottom wall 53 of the converter case 50 may be located within one of, at the bottom wall 43 side, three regions into which a space between the flange 42 and the bottom wall 43 of the stack case 40 is equally divided in the X direction. The reactor 21 may be located within one of, closest to the bottom wall 43 side, four regions into which the space is equally divided.

The reason why the certain space between the reactor 21 and the side wall 44 of the stack case 40 is ensured is to prevent an electrical short circuit between the reactor 21 and the side wall 44. The space between the reactor 21 and the side wall 44 may be from about 3 mm to about 7 mm Additionally, a space between each of the components other than the reactor 21 and the side wall 44 may be ensured to a certain degree, in order to prevent the electrical short circuit between the components and the side wall 44. Also, a component has a manufacturing tolerance. Thus, a certain space between the component of the boost converter 20 and the side wall 44 is ensured, thereby suppressing the components of the boost converter 20 from interfering with the side wall 44 when the converter case 50 is assembled to the stack case 40.

As illustrated in FIG. 9A, the end portion, at the side wall 44 side, of the reactor 21 may overlap the side wall 44 of the stack case 40 in the X direction. Therefore, the space formed by the inclination of the side wall 44 with respect to the bottom wall 43 of the stack case 40 is effectively used, and the increase in size (high profile) of the fuel cell unit 300 is suppressed. The third embodiment exemplary describes the reactor 21 whose end portion at the side wall 44 side of the stack case 40 farthest from the bottom wall 53 of the converter case 50 overlaps the side wall 44 in the X direction. However, it is not limited to this. The end portion, at the side wall 44 side, of the other component of the boost converter 20 may overlap the side wall 44 in the X direction.

As illustrated in FIGS. 9A and 9B, the boost converter 20 includes: the reactor 21 whose end portion at the side wall 44 side of the stack case 40 is farthest from the bottom wall 53 of the converter case 50; the current sensor 22, the distance between the end portion thereof, at the side wall 44 side, and the bottom wall 53 being smaller than the distance between the end portion of the reactor 21, at the side wall 44 side, and the bottom wall 53; and the IPM 23, the distance between the end portion thereof, at the side wall 44 side, and the bottom wall 53 being smaller than the distance between the end portion of the current sensor 22, at the side wall 44 side, and the bottom wall 53. The IPM 23, the current sensor 22, and the reactor 21 may be arranged in this order from the flange 42 side of the stack case 40. Thus, the space between the boost converter 20 and the side wall 44 of the stack case 40 is effectively used.

As for at least one of the components of the boost converter 20, the end portion, at the side wall 44 side, thereof may be inclined along the side wall 44.

Fourth Embodiment

Figure 10:
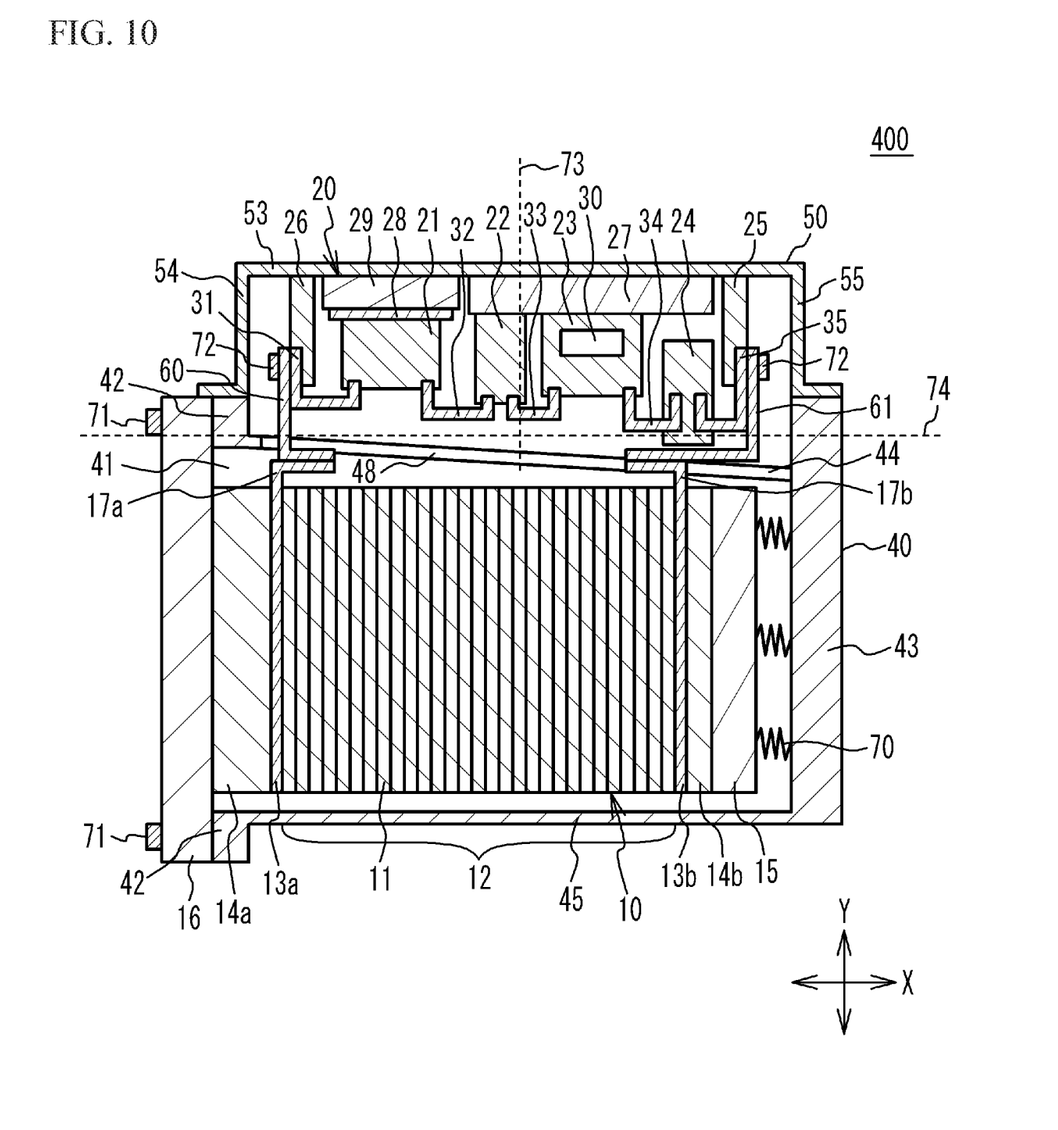
FIG. 10 is a cross-sectional view of a fuel cell unit according to a fourth embodiment.

FIG. 10 is a cross-sectional view of a fuel cell unit according to a fourth embodiment. As illustrated in FIG. 10, in a fuel cell unit 400 according to the fourth embodiment, positions of the reactor 21, the current sensor 22, the IPM 23, and the capacitor 24 of the boost converter 20 are different from those of the first to third embodiments. In the fourth embodiment, the reactor 21, the current sensor 22, the IPM 23, and the capacitor 24 are arranged in this order from the flange 42 of the stack case 40 to the bottom wall 43. The size of the capacitor 24 is increased, as compared with the first to third embodiments. As compared with the components of the boost converter 20, a distance between the end portion of the capacitor 24, at the side wall 44 side of the stack case 40, and the bottom wall 53 of the converter case 50 is longest. The capacitor 24 is located at the bottom wall 43 side with respect to the virtual surface 73 located at the middle between the flange 42 and the bottom wall 43 of the stack case 40. Further, the capacitor 24 protrudes toward the side wall 44 across the virtual surface 74 that extends in parallel to the X direction and passes through a point where the surface of the side wall 44 of the stack case 40 at the boost converter 20 side is connected to the flange 42. In other words, the end portion of the capacitor 24, at the side wall 44 side of the stack case 40, overlaps the side wall 44 in the X direction. Other components are the same as those of the first embodiment, and the description thereof is omitted.

In the fourth embodiment, among the components of the boost converter 20, the component whose end portion, at the side wall 44 side of the stack case 40, is farthest from the bottom wall 53 of the converter case 50 is the capacitor 24. In this case, the size of the capacitor 24 is large. An amount of heat generated from the capacitor 24 correlates to a capacity of the capacitor 24. The amount of heat decreases as the size of the capacitor 24 increases. Therefore, according to the fourth embodiment, the amount of heat from the capacitor 24 is reduced.

Like the second embodiment, the side wall 45 of the stack case 40 may be inclined with respect to the bottom wall 43 in the third and fourth embodiments.

In the first to fourth embodiments, the fuel cell unit may be mounted on the vehicle or the like in a state where the side wall 45 side of the stack case 40 faces downward in the gravity direction. However, the fuel cell unit may be mounted on the vehicle or the like in another direction. For example, the fuel cell unit may be mounted on the vehicle or the like in a state where the end plate 16 faces downward in the gravity direction. The fuel cell unit may be mounted on the vehicle or the like in a state where the bottom wall 53 side of the converter case 50 faces downward in the gravity direction.

The first to fourth embodiments describe the boost converter 20 as an example of a power converter that converts the output power of the fuel cell stack 10. However, the power converter is not limited to the boost converter 20. For example, the power converter may be a step-down converter, a step-up/step-down converter for performing both step-up and step-down, or an inverter for converts direct-current power into alternating-current power.

Although some embodiments of the present disclosure have been described in detail, the present disclosure is not limited to the specific embodiments but may be varied or changed within the scope of the present disclosure as claimed.

The invention claimed is:

1. A fuel cell unit comprising:
  a fuel cell stack including:
    a cell stack in which unit cells are stacked in a first direction;
    a first terminal respectively disposed at a first end of the cell stack in the first direction; and
    a second terminal disposed at a second end of the cell stack in the first direction;
  an end plate disposed at a side opposite to the first end of the cell stack with respect to the first terminal;
  a power converter that converts output power of the fuel cell stack;
  a stack case that houses the fuel cell stack;
  a power converter case that houses the power converter and is fixed to the stack case;
  a first bus bar that electrically connects the first terminal and the power converter in the stack case and the power converter case; and
  a second bus bar that electrically connects the second terminal and the power converter in the stack case and the power converter case,
  wherein
  the first terminal includes a first protruding portion protruding from the cell stack and connected to the first bus bar,
  the second terminal includes a second protruding portion protruding from the cell stack and connected to the second bus bar,
  the stack case includes:
    a flange formed into a frame shape defining a first opening at its inside, with the first opening facing in the first direction and configured to accept the fuel cell stack through the first opening, the flange being fixed to the end plate such that the fuel cell stack is housed in the stack case when the fuel cell stack is inserted through the first opening into the stack case;
    a first bottom wall, the fuel cell stack being sandwiched between the first bottom wall adjacent the second end of the fuel cell stack in the first direction and the end plate adjacent the first end of the fuel cell stack in the first direction;
    a first side wall disposed between the fuel cell stack and the power converter, connected between the flange and the first bottom wall, and including a second opening allowing the first and second bus bars to be respectively connected to the first and second terminals; and
    a second side wall connected between the flange and the first bottom wall, the fuel cell stack being disposed between the first side wall and the second side wall in a second direction perpendicular to the first direction,
  the first side wall is inclined with respect to the first bottom wall such that a distance between the first side wall and the second side wall is greater at a side of the flange than at a side of the first bottom wall,
  an angle between the first side wall and the first bottom wall at a side of the fuel cell stack is greater than an angle between the second side wall and the first bottom wall at a side of the fuel cell stack, and
  the first side wall overlaps the second protruding portion of the second terminal in a third direction perpendicular to the first direction and the second direction.

2. The fuel cell unit according to claim 1, wherein the angle between the second side wall and the first bottom wall at the side of the fuel cell stack is a right angle.

3. The fuel cell unit according to claim 1, wherein
the power converter case includes a second bottom wall, the power converter being disposed between the second bottom wall and the first side wall in the second direction,
components of the power converter include a first component,
an end portion of the first component at a side of the first side wall is farthest from the second bottom wall between the components,
the first component is located at a side of the first bottom wall with respect to a middle between the flange and the first bottom wall in the first direction.

4. The fuel cell unit according to claim 3, wherein
the components include the first component, a second component, and a third component,
a distance between the second bottom wall and an end portion of the second component at a side of the first side wall is smaller than a distance between the second bottom wall and the end portion of the first component,
a distance between the second bottom wall and an end portion of the third component at a side of the first side wall is smaller than the distance between the second bottom wall and the end portion of the second component, and
the third component, the second component, and the first component are arranged in this order from the flange.

5. The fuel cell unit according to claim 1, wherein one component, of components of the power converter, includes an end portion, at a first side wall, overlapping the first side wall in the first direction.

6. The fuel cell unit according to claim 1, wherein
the power converter case includes a third side wall along the second direction, and
the third side wall includes an opening that permits an external device to be electrically connected to the power converter.

7. The fuel cell unit according to claim 1, wherein
the flange includes:
    a flat surface to which the end plate is fixed, and
    an outer peripheral surface continuous from an edge of the flat surface,
the outer peripheral surface of the flange is flat from one end to another end in the first direction, and
the power converter case is fixed to the outer peripheral surface of the flange.

8. The fuel cell unit according to claim 1, wherein a height of the stack case in the second direction is maximum at a position where the flange is provided.

9. The fuel cell unit according to claim 1, wherein a length of the first opening in the second direction is greater than a length of the fuel cell stack in the second direction.

10. The fuel cell unit according to claim 1, wherein a distance between the first side wall and the second side wall at an end of the second opening at a side of the flange in the second direction is greater than a length of the fuel cell stack in the second direction.

* * * * *